(12) United States Patent
Bohmer

(10) Patent No.: US 11,566,120 B2
(45) Date of Patent: Jan. 31, 2023

(54) PLASTICIZER IMPROVING DYNAMIC FATIGUE PERFORMANCE IN FIBER REINFORCED ELASTOMERS

(71) Applicant: Abaco Drilling Technologies LLC, Houston, TX (US)

(72) Inventor: Robert Bohmer, Kingwood, TX (US)

(73) Assignee: Abaco Drilling Technologies, LLC, Houston, TX (US)

( * ) Notice: Subject to any disclaimer, the term of this patent is extended or adjusted under 35 U.S.C. 154(b) by 294 days.

(21) Appl. No.: 16/743,245

(22) Filed: Jan. 15, 2020

(65) Prior Publication Data

US 2020/0224655 A1 Jul. 16, 2020

Related U.S. Application Data

(60) Provisional application No. 62/792,499, filed on Jan. 15, 2019.

(51) Int. Cl.
| | | |
|---|---|---|
| *C08L 9/02* | (2006.01) | |
| *F04C 29/00* | (2006.01) | |
| *F04C 2/107* | (2006.01) | |
| *C08K 3/04* | (2006.01) | |
| *C08K 7/02* | (2006.01) | |
| *C08J 5/04* | (2006.01) | |
| *C08J 5/06* | (2006.01) | |
| *C08K 5/12* | (2006.01) | |
| *C08L 15/00* | (2006.01) | |

(52) U.S. Cl.
CPC ............... *C08L 9/02* (2013.01); *C08J 5/046* (2013.01); *C08J 5/06* (2013.01); *C08K 3/04* (2013.01); *C08K 5/12* (2013.01); *C08K 7/02* (2013.01); *C08L 15/005* (2013.01); *F04C 2/1075* (2013.01); *F04C 29/00* (2013.01); *C08J 2309/02* (2013.01); *C08J 2315/00* (2013.01); *C08J 2477/10* (2013.01); *C08K 2201/011* (2013.01); *F04C 2240/10* (2013.01); *F04C 2250/30* (2013.01); *F05C 2225/02* (2013.01); *F05C 2253/16* (2013.01)

(58) Field of Classification Search
CPC . C08L 9/02; C08L 15/005; C08J 5/046; C08J 5/06; C08J 2309/02; C08J 2315/00; C08J 2477/10; C08K 3/04; C08K 5/12; C08K 7/02; C08K 2201/011; F04C 29/00; F04C 2240/10; F04C 2250/30; F05C 2225/02; F05C 2253/16

USPC .......................................................... 524/496
See application file for complete search history.

(56) References Cited

U.S. PATENT DOCUMENTS

| | | | |
|---|---|---|---|
| 4,154,720 A | 5/1979 | Wilson | |
| 4,258,165 A | 3/1981 | Emura et al. | |
| 4,605,694 A | 8/1986 | Walker | |
| 4,645,791 A | 2/1987 | Theodore et al. | |
| 4,853,428 A | 8/1989 | Theodore et al. | |
| 5,508,354 A | 4/1996 | Talma et al. | |
| 5,554,683 A * | 9/1996 | Oshima | C08L 33/08 524/297 |
| 7,741,392 B2 | 6/2010 | Nasreddine et al. | |
| 8,944,789 B2 * | 2/2015 | Butuc | F04C 2/1075 418/152 |
| 10,215,176 B2 * | 2/2019 | Cariveau | F03C 2/08 |
| 11,015,603 B2 * | 5/2021 | Cariveau | C08K 7/02 |
| 2011/0116960 A1 * | 5/2011 | Akbari | F04C 13/002 418/48 |
| 2013/0071628 A1 * | 3/2013 | La Forest | D04H 1/72 428/184 |
| 2015/0022051 A1 * | 1/2015 | Meng | B29C 45/0001 524/514 |
| 2020/0238580 A1 * | 7/2020 | Cariveau | F04C 15/00 |
| 2021/0262468 A1 * | 8/2021 | Cariveau | B29C 70/62 |

OTHER PUBLICATIONS

U.S. Consumer Product Safety Commission Staff Statement on University of Cincinnati Report: "Toxicity Review for Trioctyltrimellitate (TOTM)"; Oct. 2018.
U.S. Appl. No. 62/175,854, filed Jun. 15, 2015, published on Dec. 15, 2016 as part of USPTO public record of what is now U.S. Pat. No. 9,796,834.

* cited by examiner

*Primary Examiner* — Hannah J Pak
(74) *Attorney, Agent, or Firm* — Zeman-Mullen & Ford, LLP

(57) ABSTRACT

The dynamic fatigue and hysteresis performances of fiber reinforced rubber compounds are compared using different plasticizers. Fiber reinforced rubber compounds including a non-linear functionalized fatty acid ester, preferably a trimellitate, and more preferably Tris (2-Ethylhexyl) Trimellitate (TOTM) are shown to demonstrate greatly improved dynamic fatigue and hysteretic performance as compared to reference fiber reinforced rubber compounds including conventional reference plasticizers such as Di-isodecyl phthalate (DIDP).

19 Claims, 5 Drawing Sheets

PLASTICIZER IMPROVING DYNAMIC FATIGUE PERFORMANCE IN FIBER REINFORCED ELASTOMERS

PRIORITY CLAIM AND RELATED APPLICATIONS

This application claims the benefit of and priority to co-pending, commonly-owned and commonly-invented U.S. Provisional Patent Application Ser. No. 62/792,499 filed Jan. 15, 2019. This application is further related to U.S. patent application Ser. No. 15/292,798, filed Oct. 13, 2016, published as U.S. Published Patent Application 2017/0101990 and now issued as U.S. Pat. No. 10,215,176. The entire disclosures of 62/792,499 and Ser. No. 15/292,798 are incorporated herein by reference as if fully set forth herein.

TECHNICAL FIELD

This disclosure is directed generally to plasticizers used for improving dynamic fatigue properties of reinforced elastomers (e.g., fiber-reinforced rubbers). In exemplary applications, such plasticizers are useful in the manufacture of stators in positive displacement motors ("PDMs").

BACKGROUND

The formulations and plasticizers described in this disclosure improve the dynamic fatigue properties of fiber reinforced rubbers, and thus are useful in many industrial and commercial applications where dynamic life is important. One such exemplary application is in fiber reinforced rubbers used in PDM stators, in which embodiments of the disclosed formulations and plasticizers improve dynamic fatigue in such reinforced rubbers. Although the reinforced rubber formulations and plasticizers described in this disclosure are not limited in their application or deployment PDM stators, such PDM stator embodiments are useful to demonstrate the advantages of the disclosed reinforce rubber formulations and plasticizers.

Persons of ordinary skill in this art will understand that, consistent with applicable standards such as ASTM D412, terms such as "Young's Modulus", "tensile modulus", or just "Modulus" (as used in this disclosure) are interchangeable to describe a parameter representing the general propensity of a material to deform (e.g. elongate) under a tensile stress load. The value of Modulus for a particular material is often measured in Pascals, and quantifies the material's propensity to deform under tensile load. The value of Modulus thus predicts a deformation in the material (or a "strain" in the material) for a given stress load. Conversely, the value of Modulus predicts the stress required to be applied to the material to achieve a certain deformation (or "strain"). Typically, although not exclusively, the measured deformation of the material (or "strain") will be an elongation under tensile stress load, or a rotation under a torque load. Thus, by way of example and again consistent with ASTM D412, the term "25% tensile Modulus" or "25% Modulus" refers to the tensile stress applied to a material (or seen in a material) at 25% elongation, "50% tensile Modulus" or "50% Modulus" refers to the tensile stress applied or seen at 50% elongation, "100% tensile Modulus" or "100% Modulus" at 100% elongation, and so on. Modulus is one important material performance property of rubber in PDM stators. Modulus is also a somewhat reliable indicator of other desirable material properties, in that higher Modulus will normally indicate higher tensile strength and crack resistance. Without some sort of reinforcement, the rubber anisotropy inevitably caused by injection molding in stator manufacturing causes the cured rubber to exhibit lower Modulus in the cylindrical transverse cross-section direction ("across the grain") versus in the cylindrical longitudinal direction ("with the grain"). Low Modulus in the transverse direction leads to premature breakdown and "chunking" of the rubber under cyclic operational loads in a PDM.

Elastic Modulus (also known as modulus of elasticity) is generally understood as a subset of Modulus, focusing on a material's characteristics in an elastic deformation region of its performance under load. Elastic Modulus describes a parameter representing the general propensity of a material to deform (e.g. elongate) elastically under a tensile stress load. Stated differently, Elastic Modulus measure's a material's resistance to being deformed elastically when a tensile stress is applied to it. The Elastic Modulus of a material may be expressed as the slope of its stress-strain curve in the elastic deformation region of its performance under load. A stiffer material will have a higher Elastic Modulus. Elastic Modulus has the formula:

$$\text{Elastic Modulus} = \text{Stress/Strain}$$

where stress is the force causing the elastic deformation divided by the area to which the force is applied, and strain is the ratio of the change in value of a selected parameter of the material caused by the stress to the original value of the parameter in an unstressed condition (such as, for example, (1) the ratio of the change in length of the material sample to the original length of the sample where the change in length is caused by tensile stress to the sample, or (2) the amount of rotation, normally measured in degrees, of the material sample about an axis where the rotation is caused by torque stress to the sample about the axis).

Dynamic Modulus (also sometimes called Complex Modulus) refers to the study of Elastic Modulus in vibration conditions when the material is subjected to multiple repeating cycles of stressing and relaxation. Dynamic Modulus (or Complex Modulus) is thus of interest in elastomer (rubber) applications such as in PDM stators. Dynamic Modulus or Complex Modulus is further relevant in analysis of materials under vibratory testing conditions such as in a rubber process analyzer or dynamic mechanical analyzer.

Storage Modulus is generally understood as a material parameter related to Elastic Modulus. The Storage Modulus reflects the elasticity of a material. If a material is 100% elastic, all of the work inputted to the material would hypothetically be returned. There would be no heat loss during stress and relaxation of the material, nor would the material ever deform inelastically after stress. In some examples, Storage Modulus reflects the amount of work returned elastically by a material when stress is applied over time. In other examples, Storage Modulus reflects the ability of a material to return to its original state after stress.

Loss Modulus is generally understood as a material parameter also related to Elastic Modulus. Loss Modulus reflects the viscous behavior of a material. Loss Modulus may also be referred to as Viscous Modulus. If a material is 100% viscous (as are most liquids), all work inputted is converted to heat and/or inelastic deformation, and the material does not return to its original state. It is desirable in elastomeric materials such as rubber to minimize the Loss Modulus in order to maximize elastic performance.

In a vibratory test, Storage Modulus measures the portion of the Complex Modulus where stress and strain occur simultaneously or in phase. In a similar vibratory test, Loss Modulus measures the portion of the Complex Modulus where strain lags stress by 90 degrees ($\pi/2$ radians).

Tan delta is a parameter of a material representing a ratio of the material's Loss Modulus to its Storage Modulus. The optimization and minimization of tan delta thus becomes important in designing elastomers (e.g. rubbers) for use in applications such as PDM stators. Low tan delta in a rubber predicts low heat loss and low permanent inelastic deformation of the elastomer under repetitive (and typically, cyclic) stress loading and relaxation during operational service.

The Payne effect is a particular feature of the Modulus-type (stress-strain) behavior of elastomers such as rubber, and is especially relevant in analysis of the performance of rubber compounds containing fillers such as carbon black and/or fiber reinforcement. Study of the Payne effect is thus advantageous in the design of fiber-reinforced elastomers (e.g. rubbers) for use in applications such as PDM stators. The Payne effect is observed in filled materials under cyclic loading conditions with small strain amplitudes. In such conditions of small strain amplitudes within each cycle, the Payne effect manifests itself as a variance of Storage Modulus depending on the amplitude of the strain responsive to the applied stress. Stated differently, the Payne effect manifests itself when Storage Modulus (the elasticity of the material) varies according to different values of strain amplitude in small strain cycle conditions.

Physically, the Payne effect can be attributed to deformation-induced changes in the material's microstructure, i.e. to breakage and recovery of weak physical bonds linking adjacent filler clusters. The specific Payne effect for a particular filled elastomer depends a lot on the filler—e.g. what the filler is, the filler's % content, etc. The Payne effect tends to vanish for unfilled elastomers.

Given the relevance of the Payne effect in the design of filled (e.g. fiber-reinforced) rubbers, constitutive models exist to represent and predict the Payne effect in exemplary situations. As a result, the Payne effect may be further illustrated very broadly and generally with reference to specific exemplary values. For some filled rubbers, The Payne effect manifests itself as Storage Modulus (i.e. the elasticity of the material) decreasing rapidly with increasing cyclic strain amplitudes between approximately 0.1% strain amplitude and approximately 20% strain amplitude. (Above approximately 20% strain amplitude, Storage Modulus stabilizes to a more constant value for different strain amplitudes.) Conversely, the Payne effect also manifests itself as Loss Modulus (i.e. the viscous behavior of the material) increasing to a corresponding maximum for the material in the same range of approximately 0.1% cyclic strain amplitude to approximately 20% cyclic strain amplitude.

As noted above, this disclosure describes optimized fiber-reinforced rubber formulations, and methods of making them, for exemplary use in PDM stator embodiments. During the rubber injection process to make PDM stators, the rubber is injected though a mold that requires the rubber to flow through a geometry with a very high length to cross section ratio. Typical stator tube geometries may have lengths of 120" to 300" for tube diameters of 4.75" and larger. Stator tubes in the 2" to 4" diameter range have typical lengths of 60" to 150" and stator tubes in the 1.5" to 2" have typical lengths of 50" to 100".

Fibers introduced into a rubber are known to strengthen the rubber composite, and improve material properties such as Modulus and crack resistance. When added to rubber, small amounts of fiber can significantly improve the life of components by acting to distribute stress across the component more effectively. This is particularly effective as the component weakens during cyclic loading. Fibers distribute and dissipate energy at the crack tip of any flaw initiation site, thereby slowing the crack initiation and propagation stage of fatigue failures. Reinforcement fibers can be fibrillated, low-fibrillated, non-fibrillated, long, and/or short.

In some applications, however, fibers within a rubber composite, while providing improved material properties, can also be detrimental to dynamic fatigue properties. Applications such as PDM stators undergo rapid compression/relaxation cycles. Over the useful life of a PDM stator, the lobes can experience multi-millions of such cycles. The surface area of fibers added to rubber composites add internal friction to the rubber that is generally proportional to the surface area of the fiber. In service, the reinforced rubber exhibits hysteresis. Internal friction through multiple cycles generates internal heat that can be detrimental to the life of the rubber. The internal friction imparted by fiber reinforcement also prevents rubber from relaxing to its original shape through strain/relaxation cycles. The reinforced rubber shows an increased tan delta as compared to corresponding performance in unreinforced rubbers. The reinforced rubber also exhibits a Payne effect. Excessive hysteresis leads to shape deformation, internal heat buildup, and eventual loss of performance of the part. In some cases, hysteresis may lead to crack propagation and failure. Increased hysteresis imparted by fibers is therefore undesirable.

Plasticizers are conventionally used as admixtures in fiber-reinforced rubber formulations to address and remediate the hysteretic effects described above. Plasticizers and related processing aids are known in the art for decreasing overall viscosity of rubber compounds to make them easier to process. Plasticizers generally decrease the attraction between polymer chains in order to make the compounds more less viscous and more flexible. Plasticizers and such related processing aids are thus of interest in the design of rubbers for use in PDM stators. It will be understood that reduced viscosity and increased ability of a rubber to be processed is advantageous in an injection molding process such as is common in the manufacture of PDM stators. Choice of plasticizer has been traditionally made in part based on compatibility with a particular rubber, ease of mixing, objectives with respect to decreasing compound viscosity, and compatibility with the environment to which the rubber will be exposed. Chemical families of such processing aids and/or plasticizers may include but are not limited to, linear fatty acid esters, adipates, sebacates, maleates and phthalates, and the like. Low molecular weight naphthenic or paraffinic oils, low molecular weight waxes, and low molecular weight rubbers such as poly-butenes are also known to be used as plasticizers. In some cases, the addition of such plasticizers can require adding more reinforcing agent such as, for example, carbon black or fiber reinforcement to achieve the same properties in the rubber without plasticizer.

Choice of plasticizer also influences the ability of the selected plasticizer to mix properly with reinforcement agents such as carbon black, silica, or aramid fibers and the like. Lower molecular weight plasticizers, while providing a larger decrease in overall processing viscosity, often times make it more difficult to thoroughly mix the carbon black and/or other reinforcing agents. Lower molecular weight plasticizers with lower viscosities do not allow the mixing elements to impart as much shear into the mixture allowing carbon black and/or other reinforcement agents to stay more agglomerated. Reinforcement agents that are more agglomerated are less reinforcing in the final compound. Such an effect can be measured in a rubber process analyzer (RPA). As strain is increased in a rubber sample, the agglomerates tend to break, requiring less stress to achieve an equivalent shear. This difference in elastic stress (delta G') at low strains and high strains indicates the degree of agglomeration of the reinforcing agent. A higher difference indicates more agglomeration. This measurement is manifested in the Payne Effect, described in more detail above.

Conversely, rubber chemists often compensate for lower shear in mixing by imparting more mechanical shear in the mixer. This in turn generates more heat which often "masticates" the elastomer decreasing its overall molecular weight. This can lead to degradation of mechanical properties. It is therefore desirable to use a plasticizing agent that minimizes the delta G' while still achieving the objective viscosity of the final compound.

Rubber chemists have historically not given great consideration to the impact of plasticizers on their interaction with reinforcement agents during dynamic flexing over multiple cycles (such as seen in PDM stator service). With high surface area reinforcing agents such as fibrillated aramid fibers, there may be a higher degree of interfacial frictional slippage between rubber and reinforcement with dynamic flexing, leading to higher internal heat generation (hysteresis) in the rubber. This leads to compression set, loss of rebound, and thereby loss of rubber integrity through many cycles. It is therefore important for a plasticizer to be well mixed with the reinforcing agent and maintain lubricity between the rubber and reinforcing agent. The functionality and molecular weight of the plasticizer have a significant influence on this flex life and fatigue.

Di-isodecyl phthalate (DIDP) is a phthalate-based plasticizer, and is frequently used in plastics and polymer coatings to alter their viscosity and other physical properties. DIDP is a mixture of compounds derived from the esterification of phthalic acid and isomeric decyl alcohols and has a generally two-dimensional, V-like molecular shape. DIDP is a serviceable plasticizer in applications that are exposed to relatively high temperatures. DIDP is thus a commonly used plasticizer in rubbers deployed in downhole drilling applications, including in PDM stators in which fiber-reinforced rubber formulations are deployed.

While serviceable in many downhole drilling applications, the plasticizing performance currently provided by DIDP in PDM reinforced rubber applications could nonetheless be improved upon. It would be highly advantageous if an alternative plasticizer (or class of plasticizers) could be identified to improve upon DIDP's plasticizing performance in reinforced rubber applications. The improved plasticizing performance of such an alternative plasticizer would be characterized by demonstrably lowering hysteresis in the reinforced rubber while under cyclic load, thereby improving overall dynamic fatigue performance of the reinforced rubber during service. More specifically, the alternative plasticizer would lower tan delta in the reinforced rubber and lessen the prominence of a Payne effect.

SUMMARY AND TECHNICAL ADVANTAGES

This disclosure describes embodiments of an improved plasticizer whose use in reinforced rubber demonstrably improves upon DIDP to remediate hysteresis and associated dynamic fatigue. Embodiments of the improved plasticizer show surprising results in reinforced rubber performance as compared to corresponding performance of DIDP as measured by metrics such as Modulus and tan delta. Yet further surprising is that the class of improved plasticizers described in this disclosure exhibit material properties and features historically disfavored for use in reinforced rubber applications. Testing memorialized by the examples, Tables and Figures in this disclosure demonstrate that such disfavor is unfounded.

Tris (2-Ethylhexyl) Trimellitate (TOTM) is a plasticizer from a class of high-molecular weight fatty acid esters. As noted above in the Background section, the functionality and molecular weight of the plasticizer have a significant influence on flex life and fatigue of the disclosed rubber compounds. This disclosure describes improved plasticizer embodiments with high molecular weight such as, for example, non-linear functionalized fatty acid esters. Trimellitates such as TOTM are one exemplary family within this class of plasticizers. This disclosure demonstrates that plasticizers in this class significantly improve dynamic fatigue properties of reinforced rubber compounds. As discussed more below, certain embodiments of high molecular weight tri-functional esters such as TOTM, when used as plasticizers, provide measurably longer mean times to failure for dynamic applications such as PDM stators and the like.

Trimellitate esters are known in the art in applications other than for improving dynamic fatigue properties of reinforced rubber compounds. For example, trimellitates are commonly used for plasticizing elastomer compounds or flexible plastics, particularly polyvinylchloride (PVC). U.S. Pat. No. 4,605,694 to Walker discloses a trimellitate composition for wire and cable applications that improves maintenance of static physical properties after aging. U.S. Pat. No. 4,258,165 to Emura et al. discloses polymerizing PVC with polyfunctional monomers including trimellitates to decrease compression set. U.S. Pat. No. 4,154,720 to Wilson discusses rubber compositions, including nitrile rubber, utilizing zinc trimellitate in a sulfur-cured system to decrease scorch. Wilson teaches use of zinc trimellitate to decrease scorch in the context of lengthening the onset of cure. None of the foregoing references teach or suggest use of trimellitates to improve the dynamic fatigue life of reinforced rubber.

Other types or classes of plasticizers and/or processing aids (i.e. not high-molecular weight fatty acid esters such as trimellitates) are known to improve dynamic properties of various rubber compounds. U.S. Pat. Nos. 4,853,428 and 4,645,791 (Theodore et al.) describe elastomer compositions with superior low temperature flexibility through the use of naphthenic and paraffinic oils as plasticizers. However, these processing aids are not well suited for high temperature applications, and have measurable solubility in diesels and other oils. Such characteristics make these processing aids unsuitable for downhole drilling applications (such as in PDM stators) in which high temperature environments in the presence of diesel-based drilling muds are to be expected. U.S. Pat. No. 5,508,354 (Talma et al.) describes the use of zinc salts of citraconic acids, which could be considered to be plasticizers. Zinc salts are likely to have high water solubility, which would not be well suited for water based drilling muds used in downhole drilling applications. Again, none of the foregoing references teach or suggest use of trimellitates to improve the dynamic fatigue life of reinforced rubber.

TOTM is known in the art as a low solubility plasticizer which is conventionally used in the medical industry. In the medical industry, the low solubility of TOTM is a key factor because many plasticizers are toxic to humans and may be linked to hormone disruption. TOTM's low solubility is believed to make it safer for use in medical applications as it is less likely to leech into any biological or environmental fluids with which it comes into contact.

Historically, TOTM has been overlooked or dismissed as a suitable plasticizer for injection-molded nitrile butadiene rubber (NBR) compounds such as PDM stators and the like, regardless of whether such NBR compounds are reinforced. Traditionally, TOTM has been considered a high-temperature plasticizer. Thus TOTM has been considered for use with hydrogenated nitrile butadiene rubber (HNBR) compounds, but not NBR compounds, since NBR is conventionally seen as less suitable than HNBR for many high-temperature applications. Additionally, use of TOTM has been disfavored with NBRs because conventional thinking has viewed TOTM as unable to reduce the viscosity of NBR sufficiently at lower temperatures to achieve desirable processing conditions. As the impact on processability is one of the primary factors when selecting a plasticizer, such conventional thinking has assumed problems mixing, extruding, or forming NBR/TOTM into useful components. Contrary to such conventional thinking, the examples, Tables and Figures set forth below in this disclosure demonstrate that TOTM provides adequate processability when used in carbon black and aramid fiber reinforced NBR compounds, while measurably improving the dynamic fatigue properties of the compound as compared to corresponding performance of currently-favored plasticizers such as DIDP.

It is therefore a technical advantage to use TOTM (and similar plasticizers) according to this disclosure to remediate dynamic fatigue in cyclic loading conditions on rubbers/elastomers, including fiber-reinforced elastomers. Further research may prove useful in gaining greater understanding why TOTM provides such measurably improved dynamic fatigue performance in reinforced rubbers. Without being bound by theory, it is believed that TOTM acts as a lubricant for NBR reinforcement agents such as fiber additives and/or carbon black. Additionally, the tri-functional molecular structure of TOTM presents TOTM molecules in a general three-dimensional tetrahedral shape. Such tri-functional structure of TOTM is in contrast to the relatively one-dimensional linear structure of fatty acids and the substantially two-dimensional V-shaped structure of DIDP. Thus it is believed that the TOTM molecular structure has a lower tendency to agglomerate as compared to the corresponding molecular structures of fatty acids and DIDP. Lower agglomeration suggests improved interactivity with the rubber molecules and therefore improved lubricity, which in turn allows for increased fiber load in the rubber while at the same time remediating the effects of hysteresis typically associated with fiber-loaded rubber compounds. As demonstrated in the examples, Tables and Figures further below in this disclosure, the use of TOTM as a plasticizer in fiber-loaded rubber compounds leads to surprisingly longer run times for dynamic applications. For example, as a reinforced rubber stator is flexed and/or compressed during operation in a PDM, the improved lubricity provided by TOTM as a plasticizer reduces the effects of hysteresis and slows degradation of the rubber.

The differences in physical properties between TOTM and DIDP are set out in detail further below in in this disclosure with reference to Table 6. Further, the disclosure below referring to Table 7 identifies additional families of plasticizer that may function in a similar manner to TOTM when admixed with fiber-reinforced rubber to improve dynamic fatigue in repetitive cycle service such as in PDM stators.

The benefits of using TOTM as the plasticizer instead of DIDP can be further illustrated through dynamic tests on a rubber process analyzer (RPA). Two widely used dynamic tests in in the rubber industry are ASTM D6601 "Measurement of Cure and After-Cure Dynamic Properties Using a Rotorless Shear Rheometer" and ASTM D6204 (Measurement of Unvulcanized Rheological Properties Using Rotorless Shear Rheometers). Curing the compounds and measuring the Elastic Modulus versus strain at a temperature substantially below the cure temperature provides information on strain softening and the effectiveness of reinforcement mixing. The ratio of Loss Modulus to Storage Modulus versus strain also provides an indication of potential hysteretic heating. Higher ratios of Loss Modulus to Storage Modulus indicate more energy dissipation and lower elasticity. This generally leads to greater hysteretic heating and potentially greater deformation and/or greater loss of shape.

In summary, TOTM plasticizer is particularly well suited for decreasing hysteretic heating with carbon black reinforced compounds containing reinforcement fibers such as, for example, aramid fibers and the like. Hysteretic heating and compression set in elastomeric compounds is indirectly measured by tan delta at set strains on a rubber process analyzer. Lower tan delta values indicate higher elasticity and lower hysteresis.

A further technical advantage of the plasticizer embodiments described in this disclosure is to provide a plasticizer that has low solubility in applications exposed to drilling mud. As noted earlier, TOTM has such low solubility, especially in water. In oil and gas development, a PDM operates to provide power to a bit while drilling. Drilling fluid (or "mud") is pumped down the drill string. The drilling mud passes through the stator, causing the rotor to turn and generate power for the drill bit.

Many drilling fluids are water based or contain an aqueous component. In certain applications, utilizing a plasticizer with low or negligible water solubility may be advantageous. As drilling fluid is pumped through a stator, the stator is exposed to the drilling fluid which may be water based. This drilling fluid may dissolve water soluble components of the stator rubber. Rubbers or compositions which utilize a plasticizer with higher water solubility may have a portion of that plasticizer removed, thereby altering the mechanical and dynamic properties of the rubber. This portion is typically a layer near the surface of the stator exposed to drilling fluid. In some instances, this loss of plasticizer results in a honeycomb of "holes" in the molecular structure of the rubber compound where the plasticizer has dissolved into environmental fluid and been washed away. These holes allow environmental fluid, such as drilling fluid, to penetrate slightly into the rubber compound and continue dissolving any remaining or newly accessible soluble components.

In fiber reinforced rubbers, the loss of plasticizer may also lead to a loss of lubrication of the reinforcing fibers and an increase in hysteretic heating. This can lead to the rubber getting brittle and eventually chunking as cracks form in the rubber. These factors each result in lower performance and shorter life of the rubber compound. As discussed, TOTM is known to have little to no solubility in water. Therefore, TOTM remains in the rubber compound and continues to perform as a molecular lubricant for fiber reinforced rubbers longer and at higher temperatures than more soluble plasticizers. When used in a stator, the use of relatively insoluble TOTM plasticizer leads to a longer operating life and less frequent need to replace the stator while operating. This results in less overall down time which can have a significant economic impact for oil and gas operations.

A further technical advantage of some embodiments including blends of longer highly fibrillated fibers and chopped low-fibrillation fibers is that shear agents may also be obviated in the mixing process. Limitations with aramid fibers such as Twaron® or KEVLAR® pulp by themselves have been the inability to obtain a consistent mix of the fibers in the bulk materials without either adding more mechanical shear in mixing or using dispersing agent such as silica, or low molecular weight rubbers and oils. Increased shear degrades the rubber compound, and, as noted above in this disclosure, dispersion agents add extraneous components that adversely affect compound properties. The incorporation of a higher molecular weight plasticizer such as, for example, TOTM, may additionally reduce or eliminate the need for dedicated shear agents in the mixing process.

According to a first aspect, therefore, exemplary embodiments provide a stator for use in a positive displacement motor or a progressing cavity pump, the stator comprising: a stator tube having interior helical pathways therein, the helical pathways extending in a longitudinal direction along the stator tube, the stator tube further including a first rubber compound; the first rubber compound including fiber reinforcement; the first rubber compound further including a first plasticizer, the first plasticizer selected from the group consisting of non-linear functionalized fatty acid esters.

Embodiments according to the first aspect may further provide that, for strains on the first rubber compound in a range between about 0.4 degrees and 1.4 degrees, the first rubber compound has a tan delta at least 10% lower than a reference tan delta, wherein the reference tan delta is for corresponding strains on a reference rubber compound between about 0.4 degrees and 1.4 degrees, wherein the reference rubber compound is the first rubber compound modified to include, in place of the first plasticizer, a reference plasticizer selected from the group consisting of Di-isodecyl phthalate (DIDP), linear fatty acid esters, adipates, sebacates, maleates and phthalates.

Embodiments according to the first aspect may further provide that, for strains on the first rubber compound in a range between about 0.4 degrees and 1.4 degrees, the first rubber compound has a lower tan delta than a reference tan delta, wherein the reference tan delta is for corresponding strains on a reference rubber compound between about 0.4 degrees and 1.4 degrees; wherein the reference rubber compound is the first rubber compound modified to include, in place of the first plasticizer, a reference plasticizer selected from the group consisting of Di-isodecyl phthalate (DIDP), linear fatty acid esters, adipates, sebacates, maleates and phthalates; and wherein the fiber reinforcement in the first rubber compound has a higher fiber content than the fiber reinforcement in the reference rubber compound.

Embodiments according to the first aspect may further provide that the first plasticizer has a molecular weight of at least 500 g/mol.

Embodiments according to the first aspect may further provide that the first rubber compound includes at least one rubber selected from the group consisting of NBR, HNBR and NBR-isoprene terpolymer.

Embodiments according to the first aspect may further provide that the first rubber compound includes a carbon nanostructure, wherein the carbon nanostructure is in a range of about 50 phr to about 110 phr based on weight.

Embodiments according to the first aspect may further provide that the fiber reinforcement includes fibrillated fibers. The fiber reinforcement may further include chopped fibers. The fibrillated fibers and chopped fibers may be in a ratio of between about 50:1 to about 3:1 of fibrillated fibers to chopped fibers.

According to a second aspect, exemplary embodiments provide a stator for use in a positive displacement motor or a progressing cavity pump, the stator comprising: a stator tube having interior helical pathways therein, the helical pathways extending in a longitudinal direction along the stator tube, the stator tube further including a first rubber compound; the first rubber compound including fiber reinforcement; the first rubber compound further including a trimellitate plasticizer.

Embodiments according to the second aspect may further provide that, for strains on the first rubber compound in a range between about 0.4 degrees and 1.4 degrees, the first rubber compound has a tan delta at least 10% lower than a reference tan delta, wherein the reference tan delta is for corresponding strains on a reference rubber compound between about 0.4 degrees and 1.4 degrees, wherein the reference rubber compound is the first rubber compound modified to include, in place of the trimellitate plasticizer, a reference plasticizer selected from the group consisting of Di-isodecyl phthalate (DIDP), linear fatty acid esters, adipates, sebacates, maleates and phthalates.

Embodiments according to the second aspect may further provide that, for strains on the first rubber compound in a range between about 0.4 degrees and 1.4 degrees, the first rubber compound has a lower tan delta than a reference tan delta, wherein the reference tan delta is for corresponding strains on a reference rubber compound between about 0.4 degrees and 1.4 degrees; wherein the reference rubber compound is the first rubber compound modified to include, in place of trimellitate plasticizer, a reference plasticizer selected from the group consisting of Di-isodecyl phthalate (DIDP), linear fatty acid esters, adipates, sebacates, maleates and phthalates; and wherein the fiber reinforcement in the first rubber compound has a higher fiber content than the fiber reinforcement in the reference rubber compound.

Embodiments according to the second aspect may further provide that the trimellitate plasticizer has a molecular weight of at least 500 g/mol.

Embodiments according to the second aspect may further provide that the first rubber compound includes at least one rubber selected from the group consisting of NBR, HNBR and NBR-isoprene terpolymer.

Embodiments according to the second aspect may further provide that the first rubber compound includes a carbon nanostructure, wherein the carbon nanostructure is in a range of about 50 phr to about 110 phr based on weight.

Embodiments according to the second aspect may further provide that the fiber reinforcement includes fibrillated fibers. The fiber reinforcement may further include chopped fibers. The fibrillated fibers and chopped fibers may be in a ratio of between about 50:1 to about 3:1 of fibrillated fibers to chopped fibers.

According to a third aspect, exemplary embodiments provide a stator for use in a positive displacement motor or a progressing cavity pump, the stator comprising: a stator tube having interior helical pathways therein, the helical pathways extending in a longitudinal direction along the stator tube, the stator tube further including a first rubber compound; the first rubber compound including fiber reinforcement; the first rubber compound further including a plasticizer, in which the plasticizer is Tris (2-Ethylhexyl) Trimellitate (TOTM).

Embodiments according to the third aspect may further provide that, for strains on the first rubber compound in a range between about 0.4 degrees and 1.4 degrees, the first rubber compound has a tan delta at least 10% lower than a reference tan delta, wherein the reference tan delta is for corresponding strains on a reference rubber compound between about 0.4 degrees and 1.4 degrees, wherein the reference rubber compound is the first rubber compound modified to include, in place of the TOTM plasticizer, a reference plasticizer selected from the group consisting of Di-isodecyl phthalate (DIDP), linear fatty acid esters, adipates, sebacates, maleates and phthalates.

Embodiments according to the third aspect may further provide that, for strains on the first rubber compound in a range between about 0.4 degrees and 1.4 degrees, the first rubber compound has a lower tan delta than a reference tan delta, wherein the reference tan delta is for corresponding strains on a reference rubber compound between about 0.4 degrees and 1.4 degrees; wherein the reference rubber compound is the first rubber compound modified to include, in place of the TOTM plasticizer, a reference plasticizer selected from the group consisting of Di-isodecyl phthalate (DIDP), linear fatty acid esters, adipates, sebacates, maleates and phthalates; and wherein the fiber reinforcement in the first rubber compound has a higher fiber content than the fiber reinforcement in the reference rubber compound.

Embodiments according to the third aspect may further provide that the TOTM plasticizer has a molecular weight of at least 500 g/mol.

Embodiments according to the third aspect may further provide that the first rubber compound includes at least one rubber selected from the group consisting of NBR, HNBR and NBR-isoprene terpolymer.

Embodiments according to the third aspect may further provide that the first rubber compound includes a carbon nanostructure, wherein the carbon nanostructure is in a range of about 50 phr to about 110 phr based on weight.

Embodiments according to the third aspect may further provide that the fiber reinforcement includes fibrillated fibers. The fiber reinforcement may further include chopped fibers. The fibrillated fibers and chopped fibers may be in a ratio of between about 50:1 to about 3:1 of fibrillated fibers to chopped fibers.

The foregoing has rather broadly outlined some features and technical advantages of the disclosed plasticizer technology, in order that the following detailed description may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described.

BRIEF DESCRIPTION OF THE DRAWINGS

For a more complete understanding of embodiments described in detail below, and the advantages thereof, reference is now made to the following drawings, in which.

DETAILED DESCRIPTION

Three variations of aramid reinforced acrylonitrile butadiene rubbers (NBR) with identical formulations with the exception of plasticizers were tested in a dynamic mechanical test apparatus that simulates forces imposed on stators used in downhole drilling. These formulations are identified in Table 1 as NBR #1, NBR #2, and NBR #3. NBR #1, #2, and #3 all contain substantially the same plasticizer content with NBR #1 containing DIDP, NBR #2 containing TOTM, and NBR #3 containing a linear fatty acid ester. All three were mixed in two passes in a tangential mixer.

It will therefore be understood that NBR #2's plasticizer is a non-linear functionalized fatty acid ester, namely a trimellitate, namely TOTM. The plasticizers in NBR #1 and NBR #3 are DIDP and a linear fatty acid ester, respectively, and are used as reference plasticizers. NBR #1 is reference rubber compound in which NBR #2 is modified to include DIDP as a plasticizer in place of TOTM. NBR #3 is reference rubber compound in which NBR #2 is modified to include a linear fatty acid ester as a plasticizer in place of TOTM.

The dynamic mechanical test apparatus is generally described in U.S. Pat. No. 9,938,829 and simulates quite accurately the performance that may be expected of a stator rubber if the rubber was deployed in a full-size PDM power section under operational downhole drilling loads. Elastomer compounds that run longer on the dynamic mechanical tester will have a reliably correspondingly longer mean time to failure when used in PDM stators for downhole drilling.

TABLE 1

Exemplary Embodiment of 2 Pass Mixing Formulations with DIDP, TOTM, or Fatty Acid Ester Plasticizers, Using Aramid Fiber Reinforcement

| Description | NBR #1 with DIDP PHR | NBR #2 with TOTM PHR | NBR#3 Fatty Acid Ester PHR |
|---|---|---|---|
| NBR | 100 | 100 | 100 |
| Aramid Fiber | 4 | 4 | 4 |
| N774 Carbon Black | 80 | 80 | 80 |
| Antioxidants | 3 | 3 | 3 |
| DIDP Processing Aid | 15 | | |
| TOTM Processing Aid | | 15 | |
| Fatty Acid Ester Processing Aid | | | 15 |
| Tackifiers | 20 | 20 | 20 |
| Curatives | 14 | 14 | 14 |
| Total Batch Weight | 236 | 236 | 236 |

Figure 1:
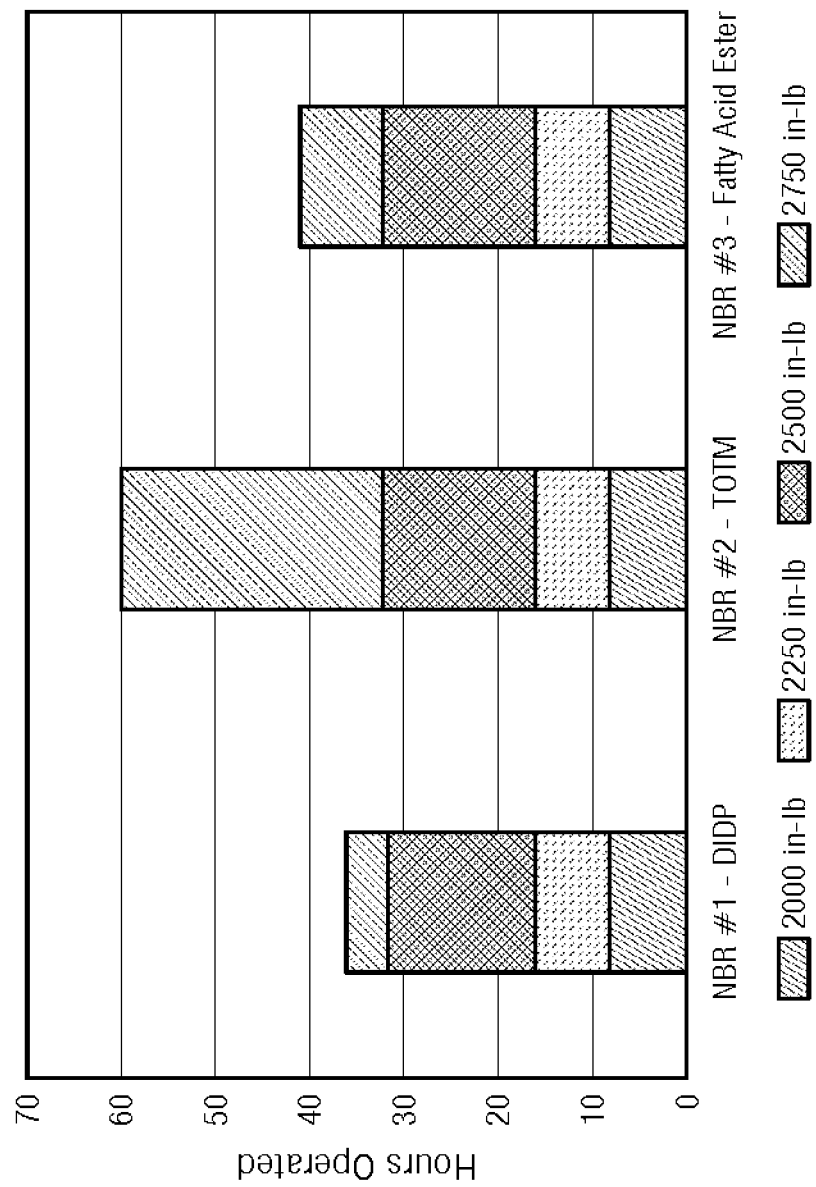
FIG. 1 is a graphical comparison of run times to failure of three similar NBR compounds (different only in the plasticizer used)

As can be seen in FIG. 1, fiber-reinforced NBR compound #2 with TOTM ran substantially longer on the dynamic mechanical tester than either fiber-reinforced NBR #1 or fiber-reinforced NBR #3. FIG. 1 further shows that each test sample was loaded during testing at a similar rate: first at 2000 in-lb for about 8 hours, then 2250 in-lb for about a further 8 hours, then 2500 in-lb for about a further 16 hours, then 2750 lb-in. Failures occurred once the test samples were loaded at 2750 lb-in after about 32 hours on the test machine. NBR #1 failed after about 4 more hours (36 hours total on the test machine). NBR #3 failed after about 9 more hours (41 hours total on the test machine). NBR #2 failed after about 28 more hours (almost 60 hours on the test machine).

FIG. 1 demonstrates that the switch from DIDP to TOTM produced surprising results, nearly doubling the run time on the mechanical tester from about 35 hours for NBR #1 to about 60 hours with NBR #2. NBR #2 with TOTM also performed significantly better than NBR #3 with Fatty Acid Ester. The use of some disclosed embodiments for PDMs should lead to significantly longer downhole run time without the need to change and replace stators as frequently. This may result in less down time tripping equipment out of the hole and significantly more efficient operations in general.

As described above in the Summary section, the increase in run time of NBR #2 with TOTM plasticizer is believed to be due to the increased molecular lubrication and decreased hysteretic heating of the fiber-reinforced rubber compound with TOTM. The benefit of TOTM plasticizer over other plasticizers may be shown more dramatically in rubber formulations with higher fiber loads. Rubber compounds with 5 phr Aramid fiber and TOTM plasticizer may be used to achieve greater reinforcement while controlling hysteretic heating, leading to even longer run times on a dynamic mechanical tester.

Fiber-reinforced NBR compounds #1 and #2 (Table 1) were tested using a MonTech D-RPA 3000. They were each cured at 160° C. for 20 minutes and then cooled to 100° C. and run through set strain angles from about 0.072 degrees (about 1% strain) to about 1.434 degrees (about 20% strain) at a frequency of 1 Hz. The difference in elastic modulus at 1% strain and 20% strain provides an indication of carbon black mixing. If the carbon black is less dispersed and/or more aggregated, there will be significant carbon black networks that require a larger force to break apart at low strains. At high strains, the rubber network dominates, so the carbon black network forces are diminished. Greater differences in Elastic Modulus indicate a lower degree of dispersion (at similar loadings) and/or higher loading levels.

Figure 2:
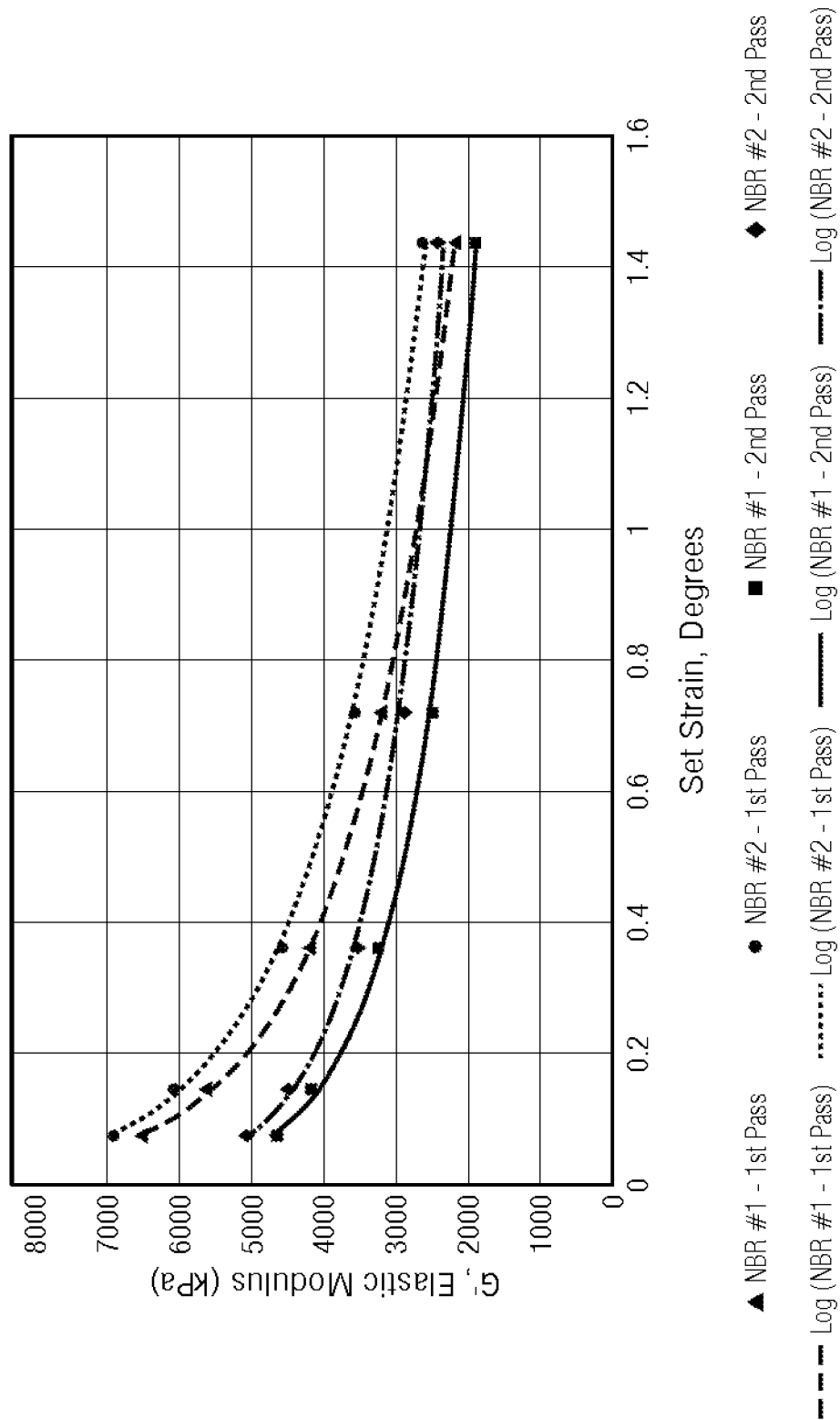
FIG. 2 is a graphical comparison of Modulus vs. set strain for two similar NBR compounds (again different only in the plasticizer used)

FIG. 2 compares the elastic modulus (or "Modulus") differences of NBR #1 and NBR #2 rubber compounds described above. FIG. 2 graphically illustrates Modulus (G') versus degrees strain. The label "Log" refers to a logarithmic curve fit applied to the data points.

Table 2 below tabulates the strain sweep data from FIG. 2 and shows the difference in Modulus from about 0.072 degrees (about 1% strain) to about 1.434 degrees (about 20% strain) for the first and second sweeps.

TABLE 2

Delta G', First and Second Sweeps of Aramid Fiber Filled NBR Stator Compounds

| Set-Strain [Degree] | NBR #1 with DIDP G'[kPa] | NBR #2 with TOTM G'[kPa] |
|---|---|---|
| 0.072 | 6469.165728 | 6905.763287 |
| 0.143 | 5582.325232 | 6062.390923 |
| 0.358 | 4189.762578 | 4561.810507 |
| 0.717 | 3157.887511 | 3531.466357 |
| 1.434 | 2154.781491 | 2613.610394 |
| 0.072 | 4602.263167 | 5028.181814 |
| 0.143 | 4162.110388 | 4470.894136 |
| 0.358 | 3232.734104 | 3507.218172 |
| 0.717 | 2448.748098 | 2846.125345 |
| 1.434 | 1867.46375 | 2402.061741 |
| Delta G', First Pass | 4314.384237 | 4292.152893 |
| Delta G', Second Pass | 2734.799417 | 2626.120073 |

Figure 3:
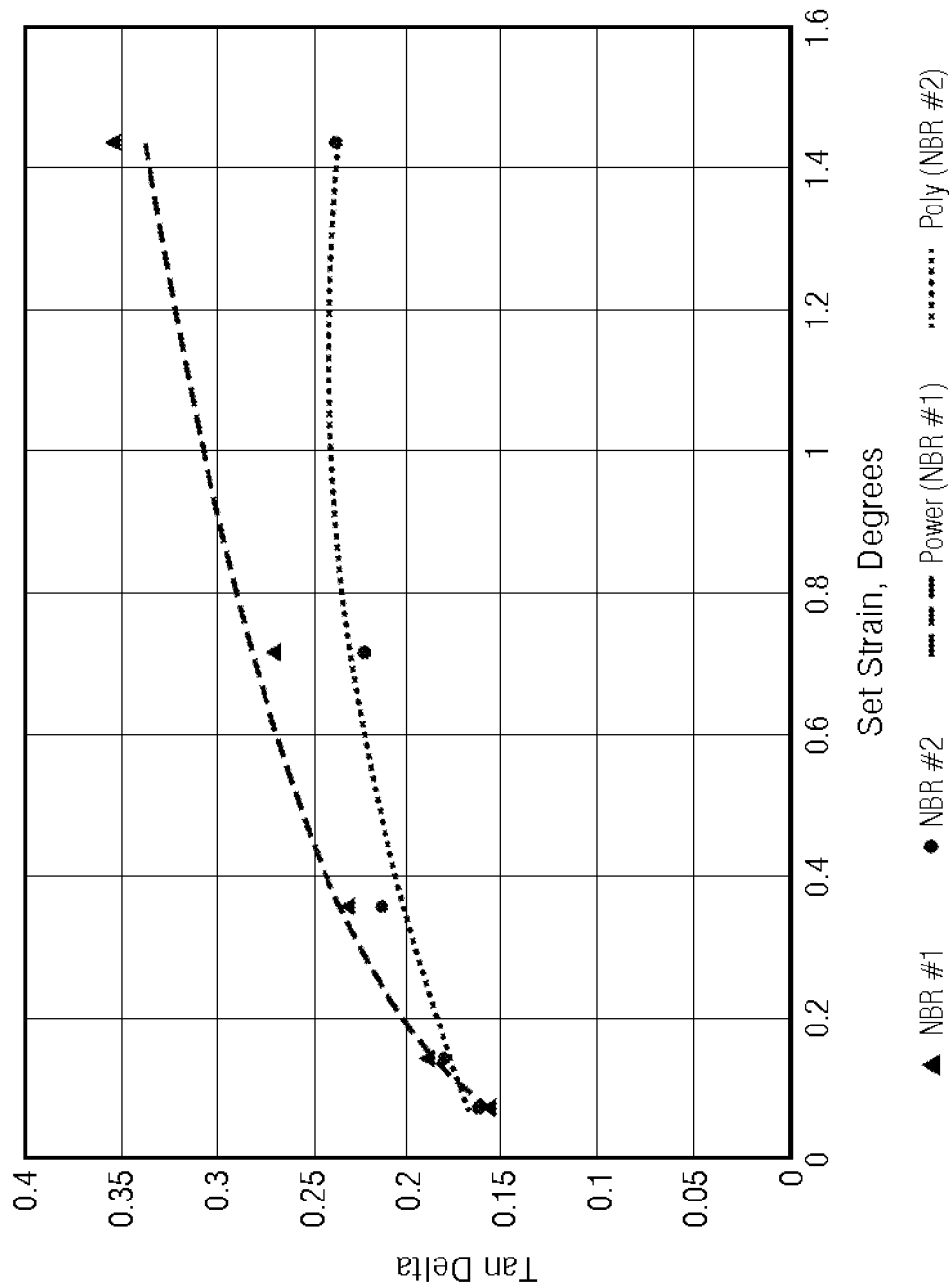
FIG. 3 is a graphical comparison of tan delta vs. set strain on a first pass loading for two similar NBR compounds (different only in the plasticizer used)
Figure 4:
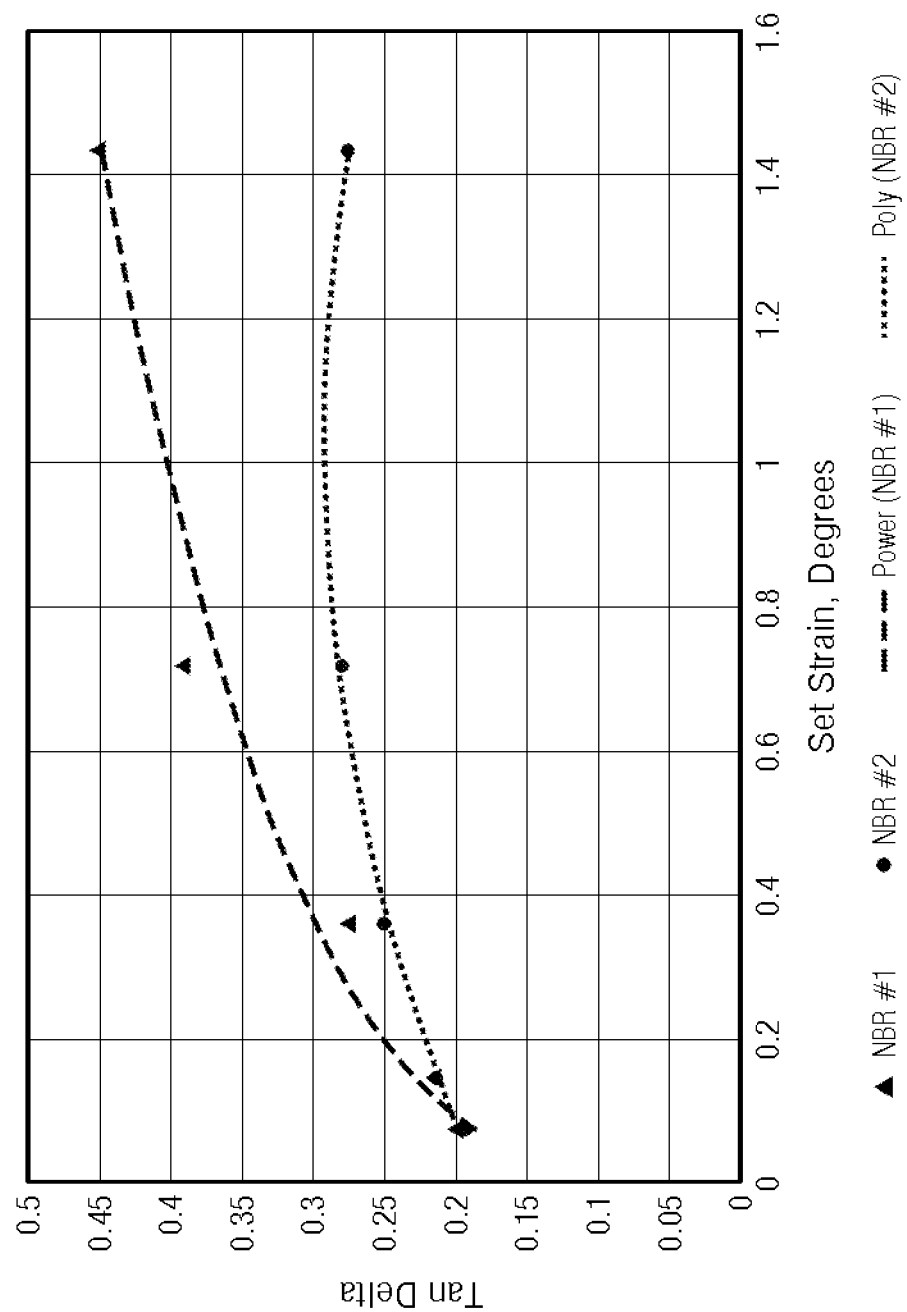
FIG. 4 similar to FIG. 3 except on a second pass loading.

Both NBR #1 and NBR #2 compounds have similar Modulus deltas for the first and second passes, indicating relatively similar dispersion levels of carbon black in the two NBR compounds. Refer now to FIGS. 3 and 4. The labels "Power" and "Poly" on FIGS. 3 and 4 refer to a geometric power curve fit and a geometric polynomial curve fit, respectively, to the data points. FIGS. 3 and 4 show that tan delta versus strain is very different for the two compounds for the first and second sweeps. FIG. 3 shows that the tan delta is much higher at higher strains for NBR #1 with DIDP than for NBR #2 with TOTM for the first pass. For the second pass, FIG. 4 shows that tan delta continues to increase with increased strain with the DIDP containing compound (NBR #1) while tan delta levels off at higher strains for the TOTM containing compound (NBR #2). As described above in the Background and Summary sections, tan delta is a key indicator of degree of hysteretic heating and compression set in fiber-reinforced elastomers. The tan delta curves indicate that the fiber reinforced compound containing TOTM (NBR #2) has less hysteretic heating and compression set compared to the fiber reinforced compound containing DIDP (NBR #1). This conclusion from FIGS. 3 and 4 agrees with the dynamic test comparison data discussed above with reference to FIG. 1. Based on this data, fiber-reinforced stator rubbers using TOTM as a plasticizer, such as NBR #2, for example, can be reasonably expected to have significantly longer operational life than corresponding fiber-reinforced stator rubbers using DIDP as a plasticizer instead.

As discussed above with reference to FIG. 1, it will be understood on FIGS. 3 and 4 that NBR #2's plasticizer is a non-linear functionalized fatty acid ester, namely a trimellitate, namely TOTM. The plasticizer in NBR #1 is DIDP and is used as a reference plasticizer. Accordingly, NBR #1 is a reference rubber compound in which NBR #2 is modified to include DIDP as a plasticizer in place of TOTM.

The results illustrated on FIGS. 3 and 4 should be further viewed in a range of strains between about 0.4 degrees (about 5.6% strain) and about 1.4 degrees (about 19.4% strain). It will be seen on both FIGS. 3 and 4 in this strain range (i.e. for both first and second passes), NBR #2 has a tan delta at least 10% lower than for NBR #1 throughout the strain range. Accordingly, for strains on NBR #2 in a range between about 0.4 degrees and 1.4 degrees, NBR #2 has a tan delta at least 10% lower than NBR #1 in the same range of strains.

Two fiber reinforced compounds, NBR #1 and NBR #2 per Table 1 above, were tested on the MonTech D RPA-3000 per ASTM D6204—"Measurement of Unvulcanized Rubber Rheological Properties Using Rotorless Shear Rheometers". The compounds were run at 100 C, 0.5 degree set strain over a frequency range of 0.02 to 100 Hz. The frequency range represents a shear rate from 0.0088 to 44 sec$^{-1}$ (inverse secant). The torque response for each strain and shear rate was converted into a curve of complex viscosity versus shear rate (it being understood that complex viscosity is a frequency-dependent viscosity function determined for a viscoelastic fluid by subjecting it to oscillating shear stresses). The curves represent ease of flow during injection on a Desma brand injection molding machine. The typical shear rate for injecting stators is between 1 and 30 sec$^{-1}$, so the test shear range simulates an expected shear rate when injection molding a PDM stator.

Figure 5:
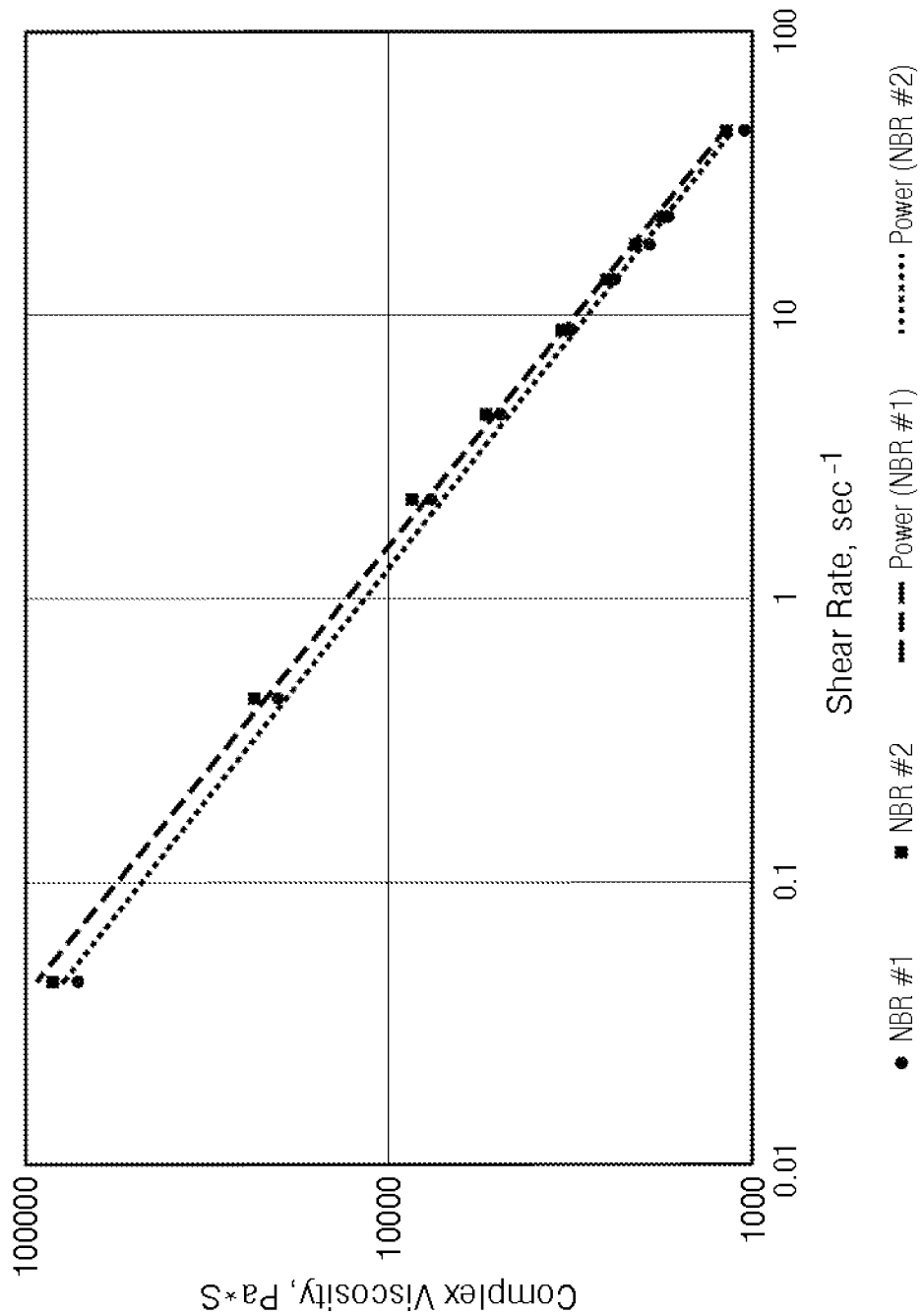
FIG. 5 is a graphical comparison of complex viscosity vs. shear rate for two similar NBR compounds (different only in the plasticizer used).

Refer now to FIG. 5. The label "Power" on FIG. 5 refers to a geometric power curve fit to the data points. Complex viscosity is shown on the y-axis in units of Pascal seconds (Pa*S). FIG. 5 compares the complex viscosity of the fiber-reinforced NBR compounds NBR #1 and NBR #2 (which as noted above with reference to Table 1 have substantially similar formulations except that NBR #1 uses DIDP plasticizer and NBR #2 uses TOTM plasticizer). NBR #2, which contains the higher molecular weight TOTM plasticizer, had slightly higher viscosity across the tested shear rate range.

The ASTM D6204 test measures Storage Modulus and Loss Modulus over the shear rate range. The shear rate at which the storage and loss moduli are equal (crossover shear rate) is used to compare molecular weights of similar compounds. Lower shear rates at which the moduli are equal indicate a higher molecular weight. The actual moduli at equivalency (crossover modulus) also indicates molecular weight distribution of similar compounds. A lower crossover modulus indicates a broader molecular weight distribution. Table 3 compares crossover shear rate and crossover modulus of the NBR containing DIDP plasticizer (NBR #1) and the NBR containing TOTM plasticizer (NBR #2).

TABLE 3

Crossover Shear Rate and Crossover Modulus of Aramid Filled NBR Stator Compounds

|  | Crossover Shear Rate, s$^{-1}$ | Crossover Modulus, kPA |
|---|---|---|
| NBR with DIDP Plasticizer | 0.1003 | 47.67 |
| NBR with TOTM Plasticizer | 0.0325 | 32.90 |

There is a significant difference in crossover shear rate and crossover modulus between the two compounds, indicating that NBR #2 has a higher molecular weight and broader molecular weight distribution than NBR #1. The difference is at least partially attributable to TOTM having a higher molecular weight than DIDP. The remainder of the difference may be attributable to differences in mixing of the compounds. TOTM, with its higher molecular weight and more branched structure, provides more efficient mixing of the carbon black and aramid fiber reinforcements. The strain sweep data shown in FIG. 2 indicates a similar distribution of reinforcing agents in the two compounds. However, the NBR #2 with TOTM apparently requires less shear and temperature to achieve the mixing. This may lead to less degradation of the base elastomer which can provide a higher molecular weight compound with a broader molecular weight distribution. A higher molecular weight compound with a broader molecular weight distribution can provide improved mechanical properties and potentially improved processability.

Table 4 provides the basic formulation of 3 NBR compounds reinforced with carbon black only and compares the tan deltas as measured on the MonTech D RPA-3000. These compounds were cured at 160 C for 20 minutes and then cooled to 100 C and run through strain angles from about 0.072 degrees to about 1.434 degrees (about 1% to about 20% strain) at a frequency of 1 Hz. NBR A contained 15 phr DIDP, and 90 phr of carbon black. NBR B contained 15 phr of TOTM and 90 phr carbon black. NBR C contained 15 phr of TOTM and 105 phr of carbon black. All of the other components in these compounds were identical, including the cure package.

TABLE 4

Tan Delta Changes with TOTM versus DIDP with Carbon Black Reinforcement Only

|  | NBR A with 15 PHR DIDP Plasticizer | NBR B with 15 PHR TOTM Plasticizer | NBR C with Higher Carbon Black Loading and 15 PHR TOTM Plasticizer |
|---|---|---|---|
| DIDP | 15 |  |  |
| TOTM |  | 15 | 15 |
| N774 Carbon Black | 90 | 90 | 105 |
| Aramid Fiber | 0 | 0 | 0 |
| Tan Delta, 20% train, Second Pass | 0.3347 | 0.2972 | 0.3526 |
| Tan Delta difference with base |  | −0.038 | 0.018 |

As can be seen from Table 4, replacing DIDP with TOTM at identical carbon black loading decreased tan delta from 0.3347 to 0.2972, a 0.038 decrease. Using TOTM plasticizer, adding an additional 15 phr of carbon black increased the tan delta from 0.3347 to 0.3526, a 0.018 increase. TOTM was shown to be also effective for decreasing tan delta as compared to DIDP for NBR compositions containing only carbon black reinforcement.

Table 5 compares tan delta of three more comparative NBR compounds, this time reinforced with both carbon black and aramid fiber. The same testing apparatus and conditions were used as discussed above with reference to Table 4 regarding NBR compounds A, B, and C. In this test, as shown in Table 5, NBR D contained 15 phr DIDP, 80 phr of carbon black, and 4 phr aramid fiber. NBR E contained 15 phr of TOTM and 80 phr carbon black, and 4 phr aramid fiber. NBR F contained 15 phr of TOTM, 80 phr of N774 carbon black, and 6 phr of aramid fiber. All other components in these compounds were identical, including the cure package.

TABLE 5

Tan Delta Changes with TOTM versus DIDP with Carbon Black and Aramid Fiber Reinforcement

|  | NBR D with 15 PHR DIDP Plasticizer | NBR E with 15 PHR TOTM Plasticizer | NBR F Higher Fiber Loading with 15 PHR TOTM Plasticizer |
|---|---|---|---|
| DIDP | 15 |  |  |
| TOTM |  | 15 | 15 |
| N774 Carbon Black | 80 | 80 | 80 |
| Aramid Fiber | 4 | 4 | 6 |
| Tan Delta, high strain, Second Pass | 0.3712 | 0.3136 | 0.3367 |
| Tan Delta difference with base |  | −0.058 | −0.035 |

Replacing DIDP with TOTM at identical carbon black and aramid fiber loadings decreased tan delta from 0.3712 to 0.3136, a 0.058 decrease. When using TOTM plasticizer, adding an additional 2 phr of aramid fiber actually decreased the tan delta from 0.3712 to 0.3367, a 0.035 decrease. Combining the results shown on FIGS. 3 and 4 with Table 5, for strains on NBR #2 in a range between about 0.4 degrees and 1.4 degrees, NBR #2 has a lower tan delta than NBR #1 in the sane range of strains even when NBR #2 is modified to have a higher fiber content than NBR #1. TOTM was much more effective in decreasing tan delta values in NBR compositions with aramid fiber reinforcement as compared to NBR compounds reinforced with carbon black alone. This is a surprising result as it is well understood in the industry that increased fiber loading, such as adding as little as 2 phr of aramid fiber, is expected to increase the tan delta and may lead to sufficiently increased hysteretic heating as to make the reinforced rubber compound effectively nonfunctional in multi-cyclic load environments such as PDM stators.

Comparing the decrease in tan delta when switching to TOTM from DIDP, the decrease in tan delta was larger for NBR compositions which included aramid fiber. Surprisingly, when using TOTM plasticizer adding additional aramid fiber actually decreased the tan delta further when compared to the base NBR formulation with DIDP. This is very surprising considering that the tan delta increased when additional carbon black reinforcement was added to NBR compositions using TOTM as shown in Table 4.

The embodiments described in this disclosure are examples. Nothing in this disclosure should be construed to limit the scope of this disclosure to the exemplary embodiments. Currently preferred embodiments comprise TOTM as a plasticizer for use with NBR, HNBR, and/or NBR-isoprene terpolymer formulations. Such embodiments may further comprise carbon black and/or fiber reinforcement. Disclosed compositions may be used for many applications. Currently preferred embodiments included disclosed PDM stators comprising disclosed compositions.

The primary differences of TOTM versus DIDP are higher molecular weight, lower volatility, higher viscosity, and lower water solubility. Table 6 illustrates these physical property differences between DIDP and TOTM. As a primary purpose of selecting plasticizers is to reduce viscosity and improve processability, the selection of higher viscosity TOTM over DIDP goes against the common understanding. As noted above in the Summary section, another molecular feature of TOTM versus DIDP is its tri-functionality with respect to the aromatic portion of the molecule as compared to DIDP which has dual functionality. The more complex functionality is believed to provide greater networking of the plasticizer thus enabling it to provide more internal lubrication between rubber and reinforcing agents.

TABLE 6

Comparison of DIDP and TOTM Physical Properties

|  | DIDP | TOTM |
| --- | --- | --- |
| Molecular Weight (g/mol) | 446.67 | 546.79 |
| Boiling Point, C. | 250-257 | 414 |
| Flash Point, C. | 275 | 263 |
| Viscosity, cps | 72 | 244 |
| Water Solubility, mg/L at 25 C. | 0.28 | 0.00039 |
| Vapor Pressure, mm Hg at 25 C. | $5.8 \times 10^{-7}$ | $3.8 \times 10^{-6}$ |

The scope of this disclosure further includes plasticizers performing in a similar manner as TOTM. Table 7 identifies additional families of plasticizers that may perform in a similar manner as TOTM. These families are known to have relatively high molecular weight (at least 250 g/mol), relatively low water solubility at room temperature (less than 0.01 mg/L at about 25° C.), and similar tri-functionality as TOTM.

TABLE 7

Additional Plasticizers Suitable for Improving Dynamic Fatigue in PDM Stators

| Plasticizer | Molecular Weight | Water Solubility, mg/L |
| --- | --- | --- |
| ESBO Epoxidized Soybean Oil | 1000 | Insoluble |
| ELSO Epoxidized Linseed Oil | 1000 | Insoluble |
| TEHTM - Tris(2-ethylhexyl) trimellitate | 546.8 | 0.00039 |
| Triglyceride family | 260-1300 | Mostly Insoluble |
| Tricrysel phosphate | 368.4 | <1 |

Embodiments of the disclosed plasticizers further relate to fiber loaded and/or high-fiber loaded rubber compositions including, in certain embodiments, compositions in which chopped fibers are used in addition to longer fibers. Some embodiments comprise highly fibrillated fibers and lower surface area fibers.

Generally speaking, highly fibrillated aramid fibers are advantageous in applications where high fiber loading is used to address anisotropy. See generally U.S. Published Patent Application 2017/0101990, now U.S. Pat. No. 10,215,176 (the entire disclosure of which is incorporated herein by reference as if fully set forth herein) for exemplary embodiments of fiber-reinforced rubbers in such applications. Highly fibrillated fibers provide increased surface branching, and thus higher fiber surface area. The higher the cumulative fiber surface area, the more fiber reinforcing that becomes available to the mix.

In some cases, more highly fibrillated fibers may interlock and, as a result, form fiber clumps and cause more problems with even fiber dispersion and distribution throughout the mix. It is known to extend mixing times to improve fiber dispersion, but extended mix times are also known to increase production cost, add mechanical stress to the finished elastomer, and increase the heat buildup in the batch during mixing. The increased mechanical stress and/or heat buildup leads to adverse effects on the compound during manufacture, such as molecular cleavage and premature scorching. In some embodiments, the use of a high molecular weight plasticizer may increase dispersion of reinforcing fibers and/or processability.

The type of fibers that may beneficially be used as a reinforcement of the stator elastomer include meta-aramids, para-aramids, polyester, polyamide, cotton, rayon and glass, as well as combinations of two or more of the foregoing, but is preferably para-aramid. The fibers may be fibrillated or pulped, as is well known in the art, where possible for a given fiber type, to increase their surface area, or they may be chopped or in the form of a staple fiber, as is similarly well known in the art. For purposes of the present disclosure, the terms "fibrillated" and "pulped" shall be used interchangeably to indicate this known characteristic, and the terms, "chopped" or "staple" will be used interchangeably to indicate the distinct, known characteristic. The fibers preferably have a length from about 0.1 to about 10 mm. The fibers may optionally be treated as desired based in part on the fiber type to improve their adhesion to the elastomer. An example of a fiber treatment is any suitable Resorcinol Formaldehyde Latex (RFL).

In embodiments in which the fibers are of the staple or chopped variety, the fibers may be formed of materials including, but not limited, to polyamide, rayon, or glass, and have an aspect ratio or "L/D" (ratio of fiber length to diameter) preferably equal to 10 or greater. In some embodiments, the chopped fibers have an aspect ratio of at least about 15, or at least about 20, or at least about 30, or at least about 40. In some embodiments, the chopped fibers have an aspect ratio of at most about 50, or at most about 45, or at most about 35, or at most about 25, or at most about 20.

The chopped fibers preferably have a length from about 0.1 to about 5 mm. In some embodiments, the chopped fibers have a length of at least about 1 mm, or at least about 2 mm, or at least about 3 mm. In some embodiments, the chopped fibers have a length of at most about 5 mm, or at most about 4 mm, or at most about 3 mm.

In other embodiments in which the fibers are of the pulped or fibrillated variety, the fibers are preferably formed of aramid or para-aramid, and possess a specific surface area of from about 1 m2/g to about 15 m2/g, more preferably of about 3 m2/g to about 12 m2/g, most preferably from about 6 m2/g to about 8 m2/g. In some embodiments, fibrillated fibers have an average fiber length of from about 0.1 mm to about 5.0 mm, more preferably of from about 0.3 mm to about 3.5 mm, and most preferably of from about 0.5 mm to about 2.0 mm.

In some embodiments, the amount of para-aramid fibrillated fiber used may beneficially be from about 1.0 to about 20.0 parts per hundred weight of nitrile rubber (or "phr"); is preferably from about 1.5 to about 10.0 parts per hundred weight of nitrile rubber, more preferably from about 2.0 to about 5.0 parts per hundred weight of nitrile rubber, and is most preferably from about 2.0 to about 4.0 parts per hundred weight of nitrile rubber. One skilled in the relevant art would recognize that at higher fiber loading concentrations, the elastomer would preferably be modified to include additional materials, e.g. plasticizers, to prevent excessive hardness of the cured elastomer or reduced content of carbon black and other filler materials.

The fibers may be added to the elastomer composition via any suitable and/or conventional technique, such as by first incorporating fibrillated fibers in a suitable first elastomer composition to form a fiber-loaded masterbatch having a final fiber content of about 50% by weight, or any other suitable amount; thereafter adding the fiber loaded master batch to the stator elastomer composition in order to allow for suitable distribution of the fiber in the final stator elastomer composition; and then forming the stator with the thus fiber loaded elastomer composition via any suitable and/or conventional technique.

The nitrile group-containing copolymer rubber composition useful in some embodiments may be cured with sulfur, organic peroxide, or other free-radical promoting material. The elastomeric material may also be cured in a mixed cure system, utilizing a combination of sulfur, an organic peroxide or other free-radical promoting material. In some disclosed embodiments, the nitrile group-containing, nitrile copolymer rubber is sulfur cured. Possible sulfur donors for curing include but are not limited to tetra-methyl-thiuram di-sulfide, tetra-ethyl-thiuram di-sulfide, di-pentamethylene thiuram di-sulfide, di-pentamethylene thiuram tetra-sulfide, di-pentamethylene thiuram hexa-sulfide, di-thio-di-morpholine, di-thio-di-caprolactam and 2-(4-morpholinyl di-thio)-benzothiazole. It is believed that if the nitrile rubber is cured with an organic peroxide and reinforced with fiber in accordance with disclosed embodiments, the high temperature resistance of the stator rubber lining would be even higher than a similar sulfur-cured rubber, and would potentially reach peak operating temperatures of 160° to 165° C. or higher.

Other conventional elastomeric additives, process and extender oils, antioxidants, waxes, pigments, plasticizers, softeners and the like may be added, in accordance with conventional rubber processing practice. For example, the elastomeric material may also contain about 60 to about 110 phr carbon black, a plasticizer preferably in an amount up to about 20 parts per hundred weight of elastomer, antioxidants, cure accelerators and/or a cure retarder. Some embodiments may contain up to about 25 parts per hundred plasticizer.

In some embodiments, a rubber compound contains at least about 50 phr carbon black, or at least about 60 phr carbon black, for at least about 70 phr carbon black, or at least about 80 phr carbon black, for at least about 90 phr carbon black, or at least about 100 phr carbon black, for at least about 110 phr carbon black, or at least about 120 phr carbon black. In some embodiments, a rubber compound contains at most about 50 phr carbon black, or at most about 60 phr carbon black, for at most about 70 phr carbon black, or at most about 80 phr carbon black, for at most about 90 phr carbon black, or at most about 100 phr carbon black, for at most about 110 phr carbon black, or at most about 120 phr carbon black.

In some embodiments, a rubber compound comprises at least about 5 phr plasticizer, or at least about 10 phr plasticizer, or at least about 15 phr plasticizer, or at least about 20 phr plasticizer, or at least about 25 phr plasticizer. In some embodiments, a rubber compound comprises at most about 5 phr plasticizer, or at most about 10 phr plasticizer, or at most about 15 phr plasticizer, or at most about 20 phr plasticizer, or at most about 25 phr plasticizer.

In some embodiments a rubber compound comprises at least about 1 phr TOTM, or at least about 3 phr TOTM, or at least about 5 phr TOTM, or at least about 7 phr TOTM, or at least about 10 phr TOTM, or at least about 15 phr TOTM, or at least about 20 phr TOTM. In some embodiments a rubber compound comprises at most about 5 phr TOTM, or at most about 7 phr TOTM, or at most about 10 phr TOTM, or at most about 15 phr TOTM, or at most about 20 phr TOTM, or at most about 25 phr TOTM.

In some embodiments a rubber compound comprises at least about 1 phr of a tri-functional plasticizer, or at least about 3 phr of a tri-functional plasticizer, or at least about 5 phr of a tri-functional plasticizer, or at least about 7 phr of a tri-functional plasticizer, or at least about 10 phr of a tri-functional plasticizer, or at least about 15 phr of a tri-functional plasticizer, or at least about 20 phr of a tri-functional plasticizer. In some embodiments a rubber compound comprises at most about 5 phr of a tri-functional plasticizer, or at most about 7 phr of a tri-functional plasticizer, or at most about 10 phr of a tri-functional plasticizer, or at most about 15 phr of a tri-functional plasticizer, or at most about 20 phr of a tri-functional plasticizer, or at most about 25 phr of a tri-functional plasticizer.

In some embodiments, the disclosed fiber-reinforced rubber composites include manufacturing steps in which highly fibrillated aramid fibers are blended with chopped low-fibrillation fibers in the fiber loading. Preferably, the chopped fibers may be pre-cut from longer low-fibrillation fibers, although this disclosure is not limited in this regard.

The chopped fibers in the blend help prevent the highly fibrillated fibers from "interlocking" with other fibers, thereby encouraging improved dispersion of the blend throughout the rubber mix. In some embodiments, the blend also includes no extraneous components to assist fiber dispersion (such as solid or liquid dispersion agents as used in the prior art) that might adversely affect the properties of the final compound. In some embodiments, the presence of the chopped fibers in the blend also obviates a need for increased mixing times or increased mixing temperatures to aid in fiber dispersion. In certain embodiments, the benefits of including chopped fibers are improved through the use of a high molecular weight plasticizer such as, for example, TOTM.

In some embodiments, the chopped fiber is added by itself directly to the first pass mix of longer highly fibrillated fiber and rubber in manufacturing a desired rubber compound, although the scope of this disclosure is not limited in this regard. The chopped fibers in the blend interrupt the tendency of the highly fibrillated fibers to clump and "interlock". The chopped fibers and highly fibrillated fibers are chemically similar, and so the presence of the chopped fibers in the blend is not a "foreign substance" (such as a solid or liquid dispersion agent as known in the prior art), and so does not run the risk of negatively affecting the improved mechanical properties provided by the highly fibrillated fibers and/or the use of TOTM. In fact, the presence of the chopped fibers in the blend tends to boost the ability of the highly fibrillated fibers to enhance the material properties of the rubber mix, since the highly fibrillated fibers are distributed more evenly throughout the mix.

Some embodiments as described in this disclosure thus provide a stator for use in a positive displacement motor according to embodiments described in U.S. Published Patent Application 2017/0101990 (now U.S. Pat. No. 10,215,176), incorporated herein by reference, with TOTM added as a plasticizer.

Other embodiments as described in this disclosure provide a stator for use in a positive displacement motor, the stator comprising: a rubber compound formed into a stator tube having interior helical pathways therein, the helical pathways extending in a longitudinal direction along the stator tube; the rubber compound comprising a trimellitate plasticizer and a fiber reinforcement, wherein the fiber reinforcement comprises fibrillated fibers.

In such other embodiments, the plasticizer may have a molecular weight of at least 500 g/mol.

In such other embodiments, the plasticizer may be substantially insoluble in water at about room temperature.

In such other embodiments, the rubber compound may comprise NBR, and/or HNBR and/or NBR-isoprene terpolymer.

In such other embodiments, the rubber compound may further comprise a carbon nanostructure in the range of about 50 phr to about 110 phr based on weight.

In such other embodiments, the fiber reinforcement may comprise between about 2.5 phr and about 10.0 phr of fibrillated fibers based on weight.

In such other embodiments, the fibrillated fibers may have an average surface area of between about 2 $m^2/g$ and about 20 $m^2/g$.

In such other embodiments, the trimellitate plasticizer may be Tris (2-Ethylhexyl) Trimellitate (TOTM). In such TOTM embodiments, the rubber compound may have a tan delta at least 10% lower for strains of between about 0.4 degrees and about 1.4 degrees than a comparable rubber compound with, in place of TOTM, a plasticizer selected from DIDP, linear fatty acid ester, adipate, sebacate, maleate, phthalate or the like. Further, in such TOTM embodiments, the rubber compound may comprise a greater fiber content and has a lower tan delta at strains between about 0.4 degrees and about 1.4 degrees than a comparable rubber compound with, in place of TOTM, a plasticizer selected from DIDP, linear fatty acid ester, adipate, sebacate, maleate, phthalate or the like. Tan delta may optionally be measured on a rubber process analyzer or on a dynamic mechanical tester.

In embodiments in which the rubber compound comprises a trimellitate plasticizer and fibrillated fiber reinforcement, the fibrillated fibers may be aramid fibers. The rubber compound may further comprise chopped fibers. In such chopped fiber embodiments, the fibrillated fibers and chopped fibers may be present in a ratio of between about 50:1 to about 3:1 of fibrillated fibers to chopped fibers. Further, the chopped fibers have an average aspect ratio of between about 10 and about 40 and/or may have an average length of between about 0.1 to about 5 mm.

Embodiments have been described in this disclosure with reference to exemplary deployments in stators for use in positive displacement motors (PDMs). It will be appreciated, however, that exemplary deployments may also include stators for use in progressing cavity pumps (PCPs).

Although the inventive material in this disclosure has been described in detail along with some of its technical advantages, it will be understood that various changes, substitutions and alternations may be made to the detailed embodiments without departing from the broader spirit and scope of such inventive material.

I claim:

1. A stator for use in a positive displacement motor or a progressing cavity pump, the stator comprising:
    a stator tube having interior helical pathways therein, the helical pathways extending in a longitudinal direction along the stator tube, the stator tube further including a first rubber compound;
    the first rubber compound including aramid fiber reinforcement;
    the first rubber compound further including a trimellitate acting as a plasticizer;
    wherein, when the stator tube receives a rotor to form a positive displacement motor or a progressing cavity pump, rotation of the rotor within the stator tube places a cyclic compressive load on the first rubber compound.

2. The stator of claim 1, in which, for strains on the first rubber compound in a range between about 5.6% and about 19.4%, the first rubber compound has a tan delta at least 10% lower than a reference tan delta,
    herein the reference tan delta is for corresponding strains on a reference rubber compound between about 5.6% and about 19.4%, wherein the reference rubber compound is the first rubber compound modified to include, in place of trimellitate, a reference plasticizer selected from the group consisting of Di-isodecyl phthalate (DIDP), linear fatty acid esters, adipates, sebacates, maleates and phthalates.

3. The stator of claim 1, in which, for strains on the first rubber compound in a range between about 5.6% and about 19.4%, the first rubber compound has a lower tan delta than a reference tan delta,
    wherein the reference tan delta is for corresponding strains on a reference rubber compound between about 5.6% and about 19.4%;

wherein the reference rubber compound is the first rubber compound modified to include, in place of trimellitate, a reference plasticizer selected from the group consisting of Di-isodecyl phthalate (DIDP), linear fatty acid esters, adipates, sebacates, maleates and phthalates; and wherein the aramid fiber reinforcement in the first rubber compound has a higher aramid fiber content than the aramid fiber reinforcement in the reference rubber compound.

4. The stator of claim 1, in which the trimellitate has a molecular weight of at least 500 g/mol.

5. The stator of claim 1, in which the first rubber compound includes at least one rubber selected from the group consisting of NBR, HNBR and NBR-isoprene terpolymer.

6. The stator of claim 1, in which the first rubber compound includes a carbon nanostructure, wherein the carbon nanostructure is in a range from about 50 phr to about 110 phr based on weight.

7. The stator of claim 1, in which the aramid fiber reinforcement includes fibrillated aramid fibers.

8. The stator of claim 7, in which the aramid fiber reinforcement further includes chopped aramid fibers.

9. The stator of claim 8, in which the fibrillated aramid fibers and chopped aramid fibers are in a ratio of between about 50:1 to about 3:1 of fibrillated aramid fibers to chopped aramid fibers.

10. A stator for use in a positive displacement motor or a progressing cavity pump, the stator comprising:
  a stator tube having interior helical pathways therein, the helical pathways extending in a longitudinal direction along the stator tube, the stator tube further including a first rubber compound;
  the first rubber compound including aramid fiber reinforcement;
  the first rubber compound further including Tris (2-Ethylhexyl) Trimellitate (TOTM) acting as a plasticizer;
  wherein, when the stator tube receives a rotor to form a positive displacement motor or a progressing cavity pump, rotation of the rotor within the stator tube places a cyclic compressive load on the first rubber compound.

11. The stator of claim 10, in which the first rubber compound includes TOTM in a range from about 1 phr to about 25 phr.

12. The stator of claim 10, in which, for strains on the first rubber compound in a range between about 5.6% and about 19.4%, the first rubber compound has a tan delta at least 10% lower than a reference tan delta,
  wherein the reference tan delta is for corresponding strains on a reference rubber compound between about 5.6% and 19.4%, wherein the reference rubber compound is the first rubber compound modified to include, in place of TOTM, a reference plasticizer selected from the group consisting of Di-isodecyl phthalate (DIDP), linear fatty acid esters, adipates, sebacates, maleates and phthalates.

13. The stator of claim 10, in which, for strains on the first rubber compound in a range between about 5.6% and about 19.4%, the first rubber compound has a lower tan delta than a reference tan delta,
  wherein the reference tan delta is for corresponding strains on a reference rubber compound between about 5.6% and about 19.4%;
  wherein the reference rubber compound is the first rubber compound modified to include, in place of TOTM, a reference plasticizer selected from the group consisting of Di-isodecyl phthalate (DIDP), linear fatty acid esters, adipates, sebacates, maleates and phthalates; and
  wherein the aramid fiber reinforcement in the first rubber compound has a higher aramid fiber content than the aramid fiber reinforcement in the reference rubber compound.

14. The stator of claim 10, in which the TOTM has a molecular weight of at least 500 g/mol.

15. The stator of claim 10, in which the first rubber compound includes at least one rubber selected from the group consisting of NBR, HNBR and NBR-isoprene terpolymer.

16. The stator of claim 10, in which the first rubber compound includes a carbon nanostructure, wherein the carbon nanostructure is in a range from about 50 phr to about 110 phr based on weight.

17. The stator of claim 10, in which the aramid fiber reinforcement includes fibrillated aramid fibers.

18. The stator of claim 17, in which the aramid fiber reinforcement further includes chopped aramid fibers.

19. The stator of claim 18, in which the fibrillated aramid fibers and chopped aramid fibers are in a ratio of between about 50:1 to about 3:1 of fibrillated aramid fibers to chopped aramid fibers.

* * * * *

UNITED STATES PATENT AND TRADEMARK OFFICE
CERTIFICATE OF CORRECTION

PATENT NO. : 11,566,120 B2
APPLICATION NO. : 16/743245
DATED : January 31, 2023
INVENTOR(S) : Robert Bohmer It is certified that error appears in the above-identified patent and that said Letters Patent is hereby corrected as shown below:

In the Specification

In Column 16, Line 25, replace "train" with --strain--.

In the Claims

In Column 22, Line 53 (Claim 2), replace "herein" with --wherein--.

Signed and Sealed this
Eleventh Day of April, 2023

Katherine Kelly Vidal
*Director of the United States Patent and Trademark Office*